United States Patent
Cho et al.

(10) Patent No.: US 12,172,655 B2
(45) Date of Patent: Dec. 24, 2024

(54) APPARATUS AND METHOD FOR CONTROLLING VEHICLE

(71) Applicants: Hyundai Motor Company, Seoul (KR); Kia Corporation, Seoul (KR)

(72) Inventors: Woo Cheol Cho, Hwaseong-Si (KR); Kyung Han Min, Incheon (KR); Kyu Beom Ko, Incheon (KR); Hyo Jun Kwak, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 17/879,168

(22) Filed: Aug. 2, 2022

(65) Prior Publication Data
US 2023/0159036 A1    May 25, 2023

(30) Foreign Application Priority Data

Nov. 25, 2021   (KR) .................. 10-2021-0164816

(51) Int. Cl.
*B60W 40/105* (2012.01)
*B60W 10/08* (2006.01)
*B60W 30/18* (2012.01)

(52) U.S. Cl.
CPC .......... *B60W 40/105* (2013.01); *B60W 10/08* (2013.01); *B60W 30/18172* (2013.01); *B60L 2240/465* (2013.01); *B60W 2510/105* (2013.01); *B60W 2520/26* (2013.01); *B60W 2710/081* (2013.01); *B60W 2720/26* (2013.01)

(58) Field of Classification Search
None
See application file for complete search history.

(56) References Cited

U.S. PATENT DOCUMENTS

| | | | | |
|---|---|---|---|---|
| 5,501,109 | A * | 3/1996 | Naito | B60L 3/102 73/114.15 |
| 7,132,806 | B2 * | 11/2006 | Hommi | B60L 15/2045 318/434 |
| 8,447,491 | B2 * | 5/2013 | Templin | B60W 30/20 701/99 |
| 9,376,112 | B2 * | 6/2016 | Lenaga | B60K 28/16 |
| 9,604,623 | B2 * | 3/2017 | Ide | B60W 10/184 |

(Continued)

FOREIGN PATENT DOCUMENTS

| | | | | |
|---|---|---|---|---|
| CN | 102101472 | B * | 10/2014 | B60L 3/108 |
| CN | 105291883 | A * | 2/2016 | B60K 28/16 |

(Continued)

*Primary Examiner* — Kevin R Steckbauer
(74) *Attorney, Agent, or Firm* — Morgan, Lewis & Bockius LLP

(57) ABSTRACT

An apparatus and a method for controlling a vehicle includes a driveshaft that transmits a drive torque generated by a drive motor to a wheel, a sensor that obtains a speed of the vehicle, and a controller that monitors the drive torque to determine a change amount of the drive torque, determines a change in a torsion angle of the driveshaft based on the change amount of the drive torque, and determines whether wheel slip occurs based on an amount of speed change of the drive motor according to the change in the torsion angle of the driveshaft. Accordingly, it is possible to accurately determine wheel slip according to the friction of a road surface, providing safe driving to the driver.

14 Claims, 2 Drawing Sheets

(56) References Cited

U.S. PATENT DOCUMENTS

| | | | |
|---|---|---|---|
| 11,242,053 B2 * | 2/2022 | Arai | B60L 15/20 |
| 2006/0175997 A1 * | 8/2006 | Hommi | F02D 29/02 |
| | | | 318/432 |
| 2012/0101705 A1 * | 4/2012 | Templin | B60W 30/20 |
| | | | 701/99 |
| 2014/0172209 A1 * | 6/2014 | Ide | B60W 10/184 |
| | | | 701/22 |
| 2015/0360693 A1 * | 12/2015 | Ienaga | B60W 30/18172 |
| | | | 701/90 |
| 2021/0179102 A1 * | 6/2021 | Arai | B60L 15/20 |
| 2023/0070659 A1 * | 3/2023 | Oh | B60W 30/18172 |
| 2023/0159036 A1 * | 5/2023 | Cho | B60W 10/08 |
| | | | 701/74 |
| 2023/0222851 A1 * | 7/2023 | Yagasaki | G07C 5/02 |
| | | | 701/32.5 |
| 2023/0318501 A1 * | 10/2023 | Yamamoto | H02P 23/12 |
| | | | 701/22 |

FOREIGN PATENT DOCUMENTS

| | | | | |
|---|---|---|---|---|
| CN | 105291883 B | * | 9/2017 | B60K 28/16 |
| CN | 109455186 A | * | 3/2019 | B60W 50/00 |
| CN | 114590238 A | * | 6/2022 | B60W 10/04 |
| CN | 116324632 B | * | 12/2023 | B60L 15/20 |
| CN | 117507680 A | * | 2/2024 | |
| CN | 117755016 A | * | 3/2024 | |
| DE | 102014203720 A1 | * | 9/2015 | G01M 13/02 |
| DE | 102015109461 A1 | * | 12/2015 | B60K 28/16 |
| DE | 102015109461 B4 | * | 5/2017 | B60K 28/16 |
| EP | 1547854 A1 | * | 6/2005 | B60L 15/2045 |
| EP | 1787852 A2 | * | 5/2007 | B60L 15/2045 |
| EP | 2451686 B1 | * | 5/2013 | B60W 30/20 |
| JP | 4967824 B2 | * | 7/2012 | |
| JP | 5898724 B | | 4/2016 | |
| JP | 6091642 B2 | * | 3/2017 | B60L 15/20 |
| JP | 2017046389 A | * | 3/2017 | B60K 17/356 |
| JP | 2017225278 A | * | 12/2017 | |
| JP | 6578584 B2 | * | 9/2019 | B60K 17/356 |
| JP | 6720714 B2 | * | 7/2020 | |
| JP | 6977849 B1 | * | 12/2021 | B60L 15/20 |
| JP | 2022058067 A | * | 4/2022 | B60L 15/20 |
| JP | 7155674 B2 | * | 10/2022 | |
| JP | 2023140944 A | * | 10/2023 | |
| JP | 7377090 B2 | * | 11/2023 | B60L 15/20 |
| JP | 7421577 B2 | * | 1/2024 | G07C 5/02 |
| WO | WO-2015063913 A1 | * | 5/2015 | B60L 15/20 |
| WO | WO-2017033637 A1 | * | 3/2017 | B60K 17/356 |
| WO | WO-2022070589 A1 | * | 4/2022 | B60L 15/20 |

* cited by examiner

APPARATUS AND METHOD FOR CONTROLLING VEHICLE

CROSS-REFERENCE TO RELATED APPLICATION

The present application claims priority to Korean Patent Application No. 10-2021-0164816, filed on Nov. 25, 2021, the entire contents of which is incorporated herein for all purposes by this reference.

BACKGROUND OF THE PRESENT DISCLOSURE

Field of the Present Disclosure

The present disclosure relates to an apparatus and a method for controlling a vehicle.

Description of Related Art

An electric vehicle is provided with a drive motor, and is driven by transferring kinetic energy, which is generated while the drive motor rotates, to wheels thereof. Because the drive motor of an electric vehicle is responsive, the electric vehicle accelerates as soon as the driver presses an accelerator. Accordingly, when the electric vehicle accelerates momentarily, wheel slip may easily occur.

In the case of a vehicle of an internal combustion engine, wheel slip is determined using the wheel speed of a vehicle, but in the case of an electric vehicle, it is common to determine wheel slip using a motor speed. However, because the motor speed also varies according to the amount of torsion of a drive system, when wheel slip is determined using only the motor speed, there is a limit in that there is erroneous determination or determination of wheel slip is delayed. Because an erroneous determination of wheel slip may cause an accident, there is a need to provide a technology for accurately determining and controlling wheel slip.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for controlling a vehicle configured for accurately determining wheel slip by predicting an effect of a torsion amount of a drive system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of controlling a vehicle includes a driveshaft that transmits a drive torque generated by a drive motor to a wheel, a sensor that obtains a speed of the vehicle, and a controller that monitors the drive torque to determine a change amount of the drive torque, determines a change in a torsion angle of the driveshaft based on the change amount of the drive torque, and determines whether wheel slip occurs based on an amount of speed change of the drive motor according to the change in the torsion angle of the driveshaft.

The controller may be configured to determine the change in the torsion angle of the driveshaft based on the change amount of the drive torque and a torsion coefficient of the driveshaft.

The controller may convert the change in the torsion angle of the driveshaft in units to determine the amount of speed change of the drive motor.

The controller may be configured to determine a difference between a first speed of the drive motor determined based on a number of rotations of the drive motor and the amount of speed change as a second speed of the drive motor for determining the wheel slip.

The controller may be configured to determine a difference between the second speed and the speed of the vehicle as a wheel slip amount.

The controller may be configured to determine an angular acceleration of the drive motor by differentiating the second speed.

The controller may be configured to determine that the wheel slip occurs when a difference between the second speed and the speed of the vehicle exceeds a first reference value and the angular acceleration of the drive motor exceeds a second reference value.

The controller may be configured to control the speed of the vehicle and a speed of the drive motor based on an amount of the wheel slip and the angular acceleration of the drive motor when concluding that the wheel slip occurs.

According to another aspect of the present disclosure, a method of controlling a vehicle includes monitoring a drive torque of a drive motor to determine a change amount of the drive torque, determining a change in a torsion angle of a driveshaft connected to a wheel of the vehicle, based on the change amount of the drive torque, and determining whether wheel slip occurs based on an amount of speed change of the drive motor according to the change in the torsion angle of the driveshaft.

The method may further include determining the change in the torsion angle of the driveshaft based on the change amount of the drive torque and a torsion coefficient of the drive shaft.

The method may further include converting the change in the torsion angle of the driveshaft into units to determine the amount of speed change of the drive motor.

The method may further include determining a difference between a first speed of the drive motor determined based on a number of rotations of the drive motor and the amount of speed change as a second speed of the drive motor for determining the wheel slip.

A difference between the second speed and the speed of the vehicle may be determined as a wheel slip amount.

An angular acceleration of the drive motor may be determined by differentiating the second speed.

It may be determined that the wheel slip occurs when a difference between the second speed and the speed of the vehicle exceeds a first reference value and the angular acceleration of the drive motor exceeds a second reference value.

The speed of the vehicle and a speed of the drive motor may be controlled based on an amount of the wheel slip and the angular acceleration of the drive motor when concluding that the wheel slip occurs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
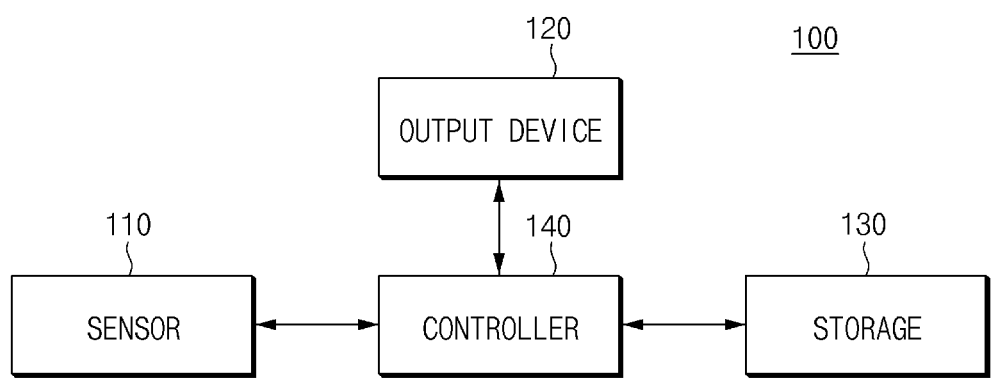
FIG. 1 is a block diagram illustrating the configuration of an apparatus configured for controlling a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment according to an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

FIG. 1 is a block diagram illustrating the configuration of an apparatus for controlling a vehicle according to an exemplary embodiment of the present disclosure.

As shown in FIG. 1, an apparatus 100 for controlling a vehicle may include a sensor 110, an output device including a driveshaft 120, storage 130, and a controller 140.

The sensor 110 may detect the speed of a vehicle, and according to an exemplary embodiment of the present disclosure, the sensor 110 may include a vehicle speed sensor.

The driveshaft 120 may transmit the drive torque generated by the drive motor to the wheel so that the wheel rotates. Because one side and an opposite side of the driveshaft 120 are connected to a wheel, even when the maximum torque is generated in the drive motor for acceleration when the vehicle accelerates rapidly, the wheel is not rotated at the maximum torque by the friction force of the wheels that are in contact with the ground, so that torsion may be caused in the driveshaft 120.

The storage 130 may store at least one algorithm for performing operations or executions of various commands for the operation of an apparatus for controlling a vehicle according to an exemplary embodiment of the present disclosure. The storage 130 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 140 may be implemented with various processing devices such as a microprocessor and the like in which a semiconductor chip configured for performing operations or executions of various commands is built-in, and may control operations of the apparatus for controlling a vehicle according to an exemplary embodiment of the present disclosure.

The controller 140 may monitor the drive torque generated by the drive motor to determine the change amount in the drive torque. When monitoring the drive torque, the controller 140 may determine the motor speed (e.g., a first speed) based on the number of rotations of the drive motor according to the drive torque.

The controller 140 may determine a change in a torsion angle of the driveshaft 120 based on the change amount in the drive torque. According to an exemplary embodiment of the present disclosure, the controller 140 may determine the change in the torsion angle of the driveshaft based on the change amount of the drive torque and a torsion coefficient of the driveshaft.

For example, the controller 140 may determine the change amount of the drive torque over time (a differential value of the drive torque) and filter only a specific value by passing it through a low pass filter. The controller 140 may determine the torsion angle of the driveshaft by dividing the change amount of the drive torque by the torsion coefficient of the driveshaft.

When the torsion angle of the driveshaft 120 is determined, the controller 140 converts the torsion angle of the driveshaft 120 in units to determine the speed change amount of the drive motor according to the torsion angle of the driveshaft 120.

The controller 140 may determine the speed of the drive motor for determining wheel slip or the speed of the vehicle for determining the wheel slip.

According to an exemplary embodiment of the present disclosure, the controller 140 may determine the speed (e.g., a second speed) of the drive motor for determining wheel slip based on the difference between the first speed determined based on the number of rotations of the drive motor and the speed change amount of the drive motor. Furthermore, the controller 140 may determine the sum of the speed of the vehicle and the speed change of the drive motor as a vehicle speed for determining the wheel slip.

The controller 140 may determine the amount of wheel slip based on the vehicle speed and the second speed of the drive motor for determining wheel slip, or based on the first speed of the drive motor and the vehicle speed for determining the wheel slip. Furthermore, the controller 140 may determine the angular acceleration of the drive motor based on the second speed.

According to an exemplary embodiment of the present disclosure, the controller 140 may determine the difference between the second speed of the drive motor for determining wheel slip and the vehicle speed as the amount of wheel slip, and determine the difference between the first speed of the drive motor and the vehicle speed for determining wheel slip as the amount of wheel slip.

Furthermore, the controller 140 may determine the angular acceleration of the drive motor to a value obtained by differentiating the second speed.

When the amount of wheel slip determined in the above-described manner exceeds a first reference value and the angular acceleration of the drive motor exceeds a second reference value, the controller 140 may determine that wheel slip has occurred. When wheel slip occurs, the controller 140 may control the speed of the vehicle and the speed of the drive motor.

The controller 140 may determine whether the amount of wheel slip is less than a third reference value after the speed of the vehicle and the speed of the drive motor are controlled after wheel slip occurs. When the wheel slip amount is less than the third reference value, the controller 140 may end the speed control.

The apparatus 100 for controlling a vehicle according to an exemplary embodiment of the present disclosure may determine the amount of wheel slip of the vehicle based on the motor speed, and redetermine the motor speed by excluding the influence of the torsion of the driveshaft on the motor speed. Furthermore, the apparatus 100 may determine the wheel slip by determining the motor angular acceleration and the amount of wheel slip based on the redetermined motor speed, so that it is possible to early determine the wheel slip by excluding an effect of torsion of the driveshaft when the friction of the road surface changes. Furthermore, it is possible to improve the accuracy of speed control for preventing wheel slip by use of the determined amount of wheel slip excluding the influence of the torsion of the driveshaft.

Figure 2:
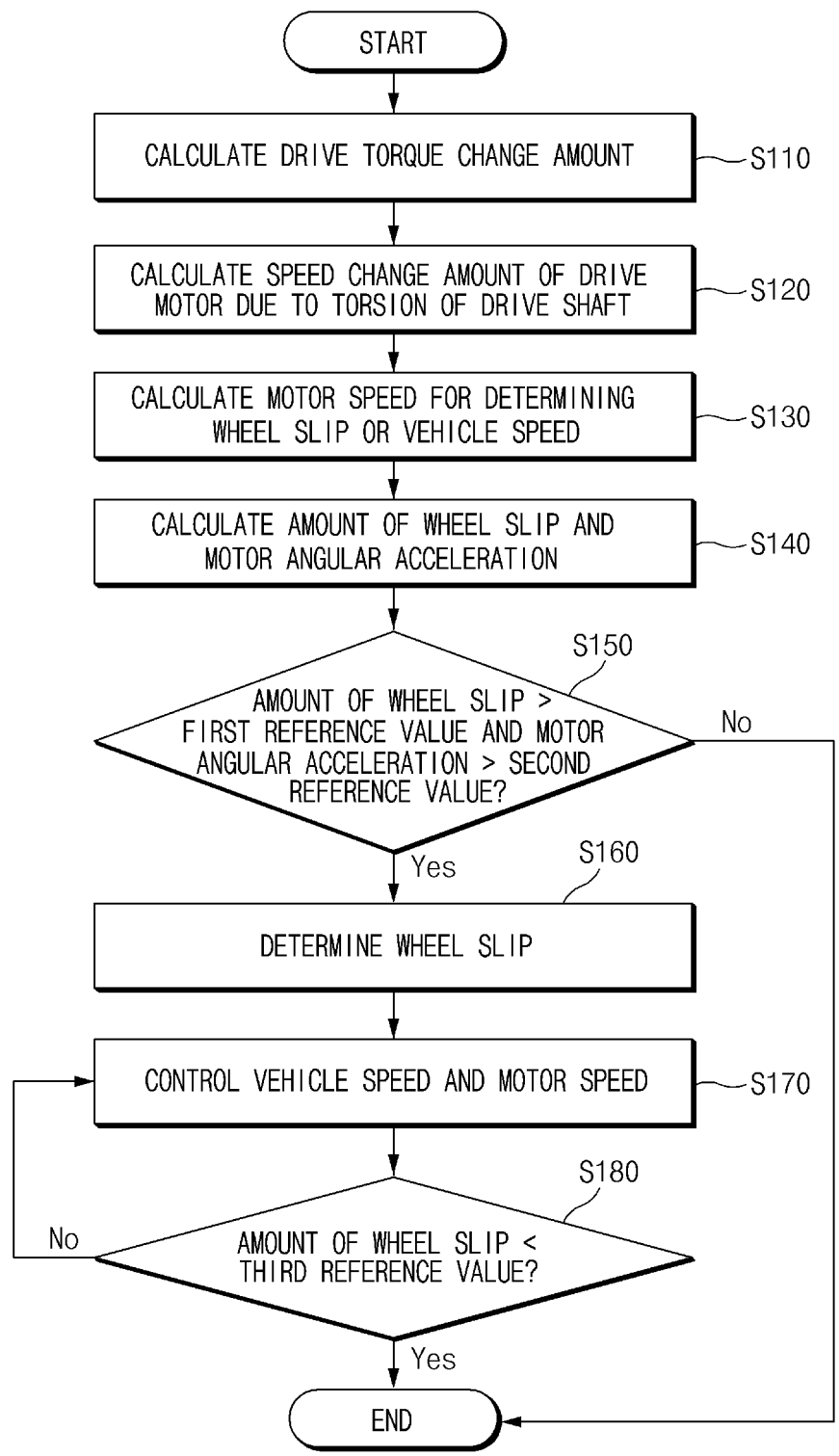
FIG. 2 is a flowchart illustrating a method of controlling a vehicle according to an exemplary embodiment of the present disclosure.

FIG. 2 is a flowchart illustrating a method of controlling a vehicle according to an exemplary embodiment of the present disclosure.

As shown in FIG. 2, in S110, the controller 140 may monitor the drive torque generated by the drive motor to determine the change amount of the drive torque. In S110, the controller 140 may determine the motor speed (e.g., the first speed) based on the number of rotations of the drive motor according to the drive torque.

In S120, the controller 140 may determine the change amount in speed of the drive motor due to torsion of the driveshaft. In S120, the controller 140 may determine the change in the torsion angle of the driveshaft 120 based on the change amount in the drive torque. According to an exemplary embodiment of the present disclosure, the controller 140 may determine the change in the torsion angle of the driveshaft based on the change amount of the drive torque and the torsion coefficient of the driveshaft.

For example, the controller 140 may determine the change amount (the differential value of the drive torque) of the drive torque over time and filter only a specific value by passing it through the low pass filter. The controller 140 may determine the torsion angle of the driveshaft by dividing the change amount in the drive torque by the torsion coefficient of the driveshaft.

When the torsion angle of the driveshaft 120 is determined, the controller 140 may convert the torsion angle of the driveshaft 120 in units to determine the speed change amount of the drive motor according to the torsion angle of the driveshaft 120.

In S130, the controller 140 may determine the motor speed for determining wheel slip or the vehicle speed for determining wheel slip.

In S130, the controller 140 may determine the difference between the first speed determined based on the number of rotations of the drive motor and the speed change amount of the drive motor, and determine the speed (e.g., the second speed) of the drive motor for determining wheel slip based on the difference. Furthermore, the controller 140 may determine the sum of the speed of the vehicle and the speed change amount of the drive motor as the vehicle speed for determining the wheel slip.

In S140, the controller 140 may determine the amount of wheel slip based on the speed of the drive motor (e.g., the second speed) for determining wheel slip, or may determine the amount of wheel slip based on the first speed of the drive motor and the vehicle speed for determining the wheel slip. Furthermore, the controller 140 may determine the angular acceleration of the drive motor based on the second speed.

According to an exemplary embodiment of the present disclosure, the controller 140 may determine the difference between the second speed of the drive motor for determining wheel slip and the speed of the vehicle as the amount of wheel slip, and determine the difference between the first speed of the drive motor and the vehicle speed for determining wheel slip as the amount of wheel slip. Furthermore, the controller 140 may determine the angular acceleration of the drive motor to a value obtained by differentiating the second speed.

In S150, the controller 140 may determine whether the amount of wheel slip determined in the above-described manner exceeds the first reference value and whether the angular acceleration of the drive motor exceeds the second reference value.

When it is determined in S150 that the amount of wheel slip determined in the above-described manner exceeds the first reference value and the angular acceleration of the drive motor exceeds the second reference value (Y), in S160, it may be determined that wheel slip has occurred. When the amount of wheel slip does not exceed the first reference value and the angular acceleration of the drive motor does not exceed the second reference value in S150, the operation may be terminated.

When wheel slip occurs in S160, the controller 140 may control the speed of the vehicle and the speed of the drive motor in S170.

After S170, the controller 140 may determine whether the amount of wheel slip is less than the third reference value in S180. In S180, when the amount of wheel slip is less than the third reference value (Y), the controller 140 may terminate the operation. When it is determined in S180 that the amount of wheel slip is not less than the third reference value (N), the controller 140 may perform S170.

According to the exemplary embodiments of the present disclosure, the apparatus and method for controlling a vehicle may predict an effect of the motor speed according to the amount of torsion of the drive system, so that it is possible to accurately determine wheel slip according to the friction of a road surface, providing safe driving to the driver.

Although exemplary embodiments of the present disclosure have been described for illustrative purposes, those skilled in the art will appreciate that various modifications, additions and substitutions are possible, without departing from the scope and spirit of the present disclosure.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle, the apparatus comprising:
    a driveshaft transmitting a drive torque generated by a drive motor of the vehicle to a wheel of the vehicle;
    a sensor configured to obtain a speed of the vehicle; and
    a controller configured to monitor the drive torque to determine a change amount of the drive torque, determine a change in a torsion angle of the driveshaft based on the change amount of the drive torque, and determine whether wheel slip of the vehicle occurs based on an amount of speed change of the drive motor according to the change in the torsion angle of the driveshaft,
    wherein the controller is further configured to conclude that the wheel slip of the vehicle occurs when a wheel slip amount exceeds a first reference value and an angular acceleration of the drive motor exceeds a second reference value.

2. The apparatus of claim 1, wherein the controller is configured to determine the change in the torsion angle of the driveshaft based on the change amount of the drive torque and a torsion coefficient of the driveshaft.

3. The apparatus of claim 1, wherein the controller is configured to convert the change in the torsion angle of the driveshaft in units to determine the amount of speed change of the drive motor.

4. The apparatus of claim 1, wherein the controller is configured to determine a difference between a first speed of the drive motor determined based on a number of rotations of the drive motor and the amount of speed change as a second speed of the drive motor for determining the wheel slip.

5. The apparatus of claim 4, wherein the controller is configured to determine a difference between the second speed and the speed of the vehicle as the wheel slip amount.

6. The apparatus of claim 5, wherein the controller is configured to determine the angular acceleration of the drive motor by differentiating the second speed.

7. The apparatus of claim 1, wherein the controller is configured to control the speed of the vehicle and a speed of the drive motor based on of the wheel slip amount and the angular acceleration of the drive motor when concluding that the wheel slip occurs.

8. A method of controlling a vehicle, the method comprising:
    monitoring, by a controller, a drive torque of a drive motor of the vehicle to determine a change amount of the drive torque;
    determining, by the controller, a change in a torsion angle of a driveshaft connected to a wheel of the vehicle, based on the change amount of the drive torque;
    determining, by the controller, whether wheel slip of the vehicle occurs based on an amount of speed change of the drive motor according to the change in the torsion angle of the driveshaft; and
    concluding, by the controller, that the wheel slip of the vehicle occurs when a wheel slip amount exceeds a first reference value and an angular acceleration of the drive motor exceeds a second reference value.

9. The method of claim 8, further including:
    determining, by the controller, the change in the torsion angle of the driveshaft based on the change amount of the drive torque and a torsion coefficient of the driveshaft.

10. The method of claim 8, further including:
    converting, by the controller, the change in the torsion angle of the driveshaft in units to determine the amount of speed change of the drive motor.

11. The method of claim 8, further including:
    determining, by the controller, a difference between a first speed of the drive motor determined based on a number of rotations of the drive motor and the amount of speed change as a second speed of the drive motor for determining the wheel slip.

12. The method of claim 11, further including:
    determining, by the controller, a difference between the second speed and a speed of the vehicle as the wheel slip amount.

13. The method of claim 12, further including:
    determining, by the controller, the angular acceleration of the drive motor by differentiating the second speed.

14. The method of claim 9, further including:
controlling, by the controller, a speed of the vehicle and a speed of the drive motor based on the wheel slip amount and the angular acceleration of the drive motor when concluding that the wheel slip occurs.

\* \* \* \* \*